L. R. STEEL.
VACUUM INSULATED METAL MILK CAN.
APPLICATION FILED JULY 20, 1910.
1,067,072.
Patented July 8, 1913.
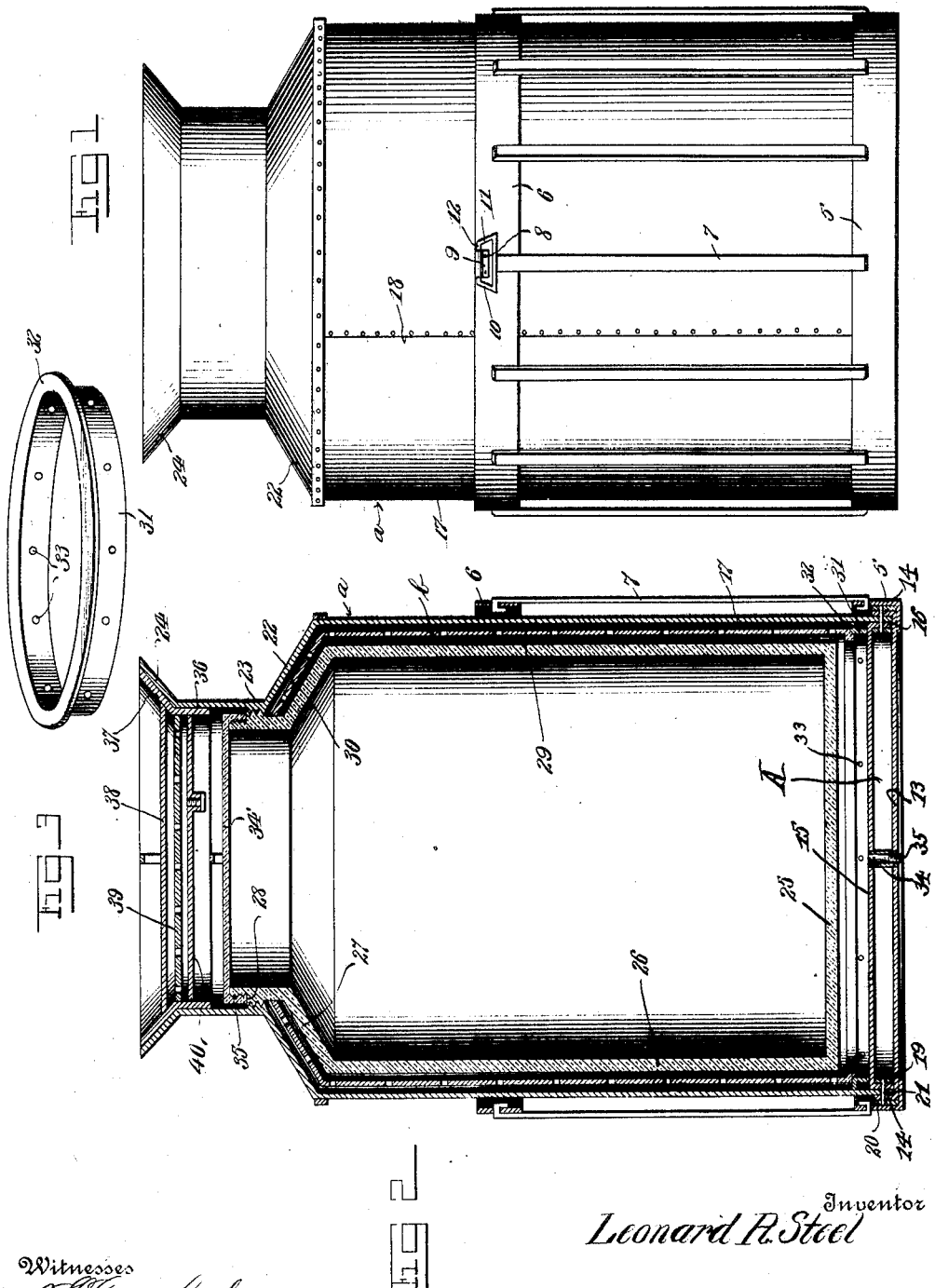
Inventor
Leonard R. Steel
By Victor J. Evans
Attorney
Witnesses
J. H. Crawford
John W. ...

UNITED STATES PATENT OFFICE.

LEONARD R. STEEL, OF CLEVELAND, OHIO.

VACUUM-INSULATED METAL MILK-CAN.

1,067,072.   Specification of Letters Patent.   Patented July 8, 1913.

Application filed July 20, 1910. Serial No. 572,900.

*To all whom it may concern:*

Be it known that I, LEONARD R. STEEL, a citizen of the United States, residing at Cleveland, in the county of Cuyahoga and State of Ohio, have invented new and useful Improvements in Vacuum-Insulated Metal Milk-Cans, of which the following is a specification.

This invention relates to improvements in milk cans and more particularly to the type granted me by Letters Patent No. 947,864 of Feb. 1, 1910. The object of the above referred to patent was to produce a milk can capable of being kept in a highly sanitary condition at all times. Without departing from this object I seek to improve the milk can above stated by a construction having for its primary object the provision of a receptacle in which the milk may be kept at a predetermined temperature without the employment of a refrigerating or heating medium.

With these and other objects in view, which will more fully hereinafter appear, the present invention consists in certain novel details of construction and arrangement of parts, hereinafter fully described, illustrated in the accompanying drawings, and more particularly pointed out in the appended claim; it being understood that various changes in the form, proportion, size, and minor details of the device may be made, within the scope of the appended claim, without departing from the spirit or sacrificing any of the advantages of the invention.

In the accompanying drawings, forming part of the specification:—Figure 1 is a side elevation of the device. Fig. 2 is a longitudinal sectional view of the same. Fig. 3 is a detail perspective of the lower ring.

Similar numerals of reference are employed to designate corresponding parts throughout.

As shown in Fig. 1 the can is arranged within a crate, the said crate being similar to the crate shown in my former patent, before referred to, with the exception that the handles of said crate in the present instance are movable. As shown in Fig. 1 the crate includes a lower annular member 5 and an upper annular member 6 connected and held in spaced relation by means of slats 7. The slats 7 are secured at their upper ends to the annular member 6 and their opposite ends are secured to the lower annular member 5 in the manner shown in Fig. 2. Positioned at diametrically opposite points on the upper circular member 6 and secured thereto by rivets 8 are a pair of plates, one of which is shown and designated by the numeral 9. The medial portions of the plates 9 are bulged outwardly and horizontally, the said bulged portions receiving the handles. The handles are each preferably formed of a single piece of stout steel wire or its equivalent bent into substantially a U-shape the opposite limbs of which are designated by the numerals 10 and 11. The limbs 10 and 11 have their free end portions bent in opposed directions as shown at 12 and inserted into the opposite ends of the bulged portion 9. With this construction it will be seen that the handles are free to swing in a vertical plane when the crate is in an upright position. The can forming part of the subject matter of the present invention is shown to include an outer receptacle *a* and an inner receptacle *b*. The outer receptacle includes a hollow bottom. This bottom comprises two telescoping disk-shaped sections of circular contour, the body portion of the lower of said sections being designated by the numeral 13 and peripherally provided with an upwardly extending circular flange 14. The body portion of the upper section is designated by the numeral 15 and is peripherally provided with a depending flange 16. The upper section is considerably less in diameter than the lower section, and since the widths of the flanges are approximately equal it will be evident when the flange 16 bears on the inner face of the body portion 13 that a space will exist between the body portions 13 and 15. The body of the outer receptacle is designated by the numeral 17 and is preferably formed of a single piece of sheet metal rolled into the shape of a hollow cylinder, the meeting ends of which overlap and are riveted or otherwise secured as shown at 18. The lower end portion of the body 17 is arranged between the opposed faces of the flanges 14 and 16 of the bottom, the parts being secured by means of rings 19 and 20. The ring 19 is arranged on the inner surface of the flange 16 depending from the body portion 15 of the upper section of the bottom, while the ring 20 is arranged on the outer surface of the flange extending upwardly from the body portion 13 of the lower section. The flanges, rings and lower end portions of the body are provided with alining openings for the reception of suitable well known fastening devices 21, the parts being further secured and hermetically sealed by means of solder. The upper end of the body portion 17 is provided with a dome-shaped head 22, the said dome-shaped head 22 having a central opening surrounded by an interiorly threaded neck 23. At the upper end of the neck 23 is a flared mouth 24, the function of which will appear later.

The inner section is preferably of glass, china, or any other analogous substance and includes a circular bottom 25, from the periphery of which rises a circular side wall 26. The side wall 26 has a dome-shaped head 27 which terminates in a shouldered neck 28. The shouldered neck 28 is exteriorly screw-threaded, the lower and larger portion of said neck screwing into the interiorly threaded neck of the outer casing, and the upper or smaller portion of the said shouldered neck extending into the neck 23 off the outer section. It will be understood that cement or any well known means may be interposed between the threaded portions above described so as to form therebetween a perfect air tight joint. By reference now to the drawings it will be seen that a considerable space exists between the wall 26 of the inner receptacle and the body portion 17 of the outer receptacle, and it will be manifest that when the neck of the inner receptacle is screwed into the neck of the outer receptacle that a space will surround the inner receptacle. Arranged in this space is a non-heat-conducting substance preferably a thin sheet of cork, asbestos, or their equivalents. This non-heat-conducting substance or insulation comprises a body portion 29, and an upper dome-shaped end portion 30. The body portion 29 of the insulation is supported by a base member, this base member comprising an annulus 31 peripherally provided with an outwardly extending flange 32 upon which bears the lower end of the body portion 29 of the insulation. The annulus is provided with a plurality of spaced openings 33. By reference now to Fig. 2 it will be seen that extending through the body portions 13 and 15 of the bottom sections is a tube 34 which is interiorly screw threaded for the reception of a plug 35, the inner end of the tube communicating with a space surrounded by the annulus 31.

By constructing the can with the space between the body portion 17 of the can and the inner glass receptacle and arranging in the space the material 29, a partial vacuum can be created in the space by extracting a great portion of the air therefrom by way of the tube 34. The material 29 forms an insulation between the outer walls of the can and the inner glass receptacle and serves to effectively protect the inner glass receptacle should the walls 17 become accidentally punctured or otherwise partly mutilated in transit or destroyed to the extent where the partial vacuum is destroyed.

The cover for the inner receptacle is shown to comprise a circular body portion designated by the numeral 34', depending from the periphery of the said body portion 34' is a circular lip 35, the said lip being interiorly screw-threaded to engage with the threads at the upper end portion of the shouldered neck 28. The cover for the outer receptacle comprises a cylindrical body portion 36, of a size to snugly fit within the neck 23, the said body portion 36 being provided with a flared side wall 37, of a size to snugly fit within the flared mouth 24. Arranged between the outer and inner ends of the flared portion of the cover and in spaced relation to the body 36 is a plate 38, said plate 38 coöperating with the body portion 36 and the bottom plate 40 to provide a compartment in which is arranged a non-heat-conducting disk 39. With this construction it will be manifest that when the air is exhausted in the compartment the heat of the atmosphere will be prevented from effecting the milk in the inner receptacle.

The non-heat conducting substance 29 is spaced throughout from the walls of the outer receptacle $a$ and the inner receptacle $b$ so that it will not interfere with the forming of a vacuum or rarefied space between the walls of the inner and outer receptacle, being perforated so as to permit the air to be readily and thoroughly exhausted from the space when desired. By providing the thin strip of non-heat conducting substance it forms a protecting element surrounding the inner receptacle $b$ so as to protect the receptacle in the event of the outer receptacle becoming accidentally punctured or mutilated to the extent that the vacuum would be destroyed. By providing the outer receptacle with the spaced lower and upper walls 13 and 15 they form in their entirety an intervening rarefied or dead air space A immediately beneath the inner receptacle. Should the lower bottom member 13 become punctured, it is obvious that the purpose of the space A as an insulation beneath the bottom of the inner receptacle will be destroyed, but the bottom forming member 15, should it remain intact on partial accidental destruction to the bottom member 13 would prevent destroying the vacuum in the space between the said inner and outer receptacles.

I claim:—

A can comprising an outer receptacle provided with an upper neck, an inner receptacle having a neck extending into the neck of the outer receptacle and adjustably connected therewith and wholly supporting the inner receptacle from the neck of the outer receptacle, a double walled bottom closing the outer receptacle, an annulus supported by the bottom and heat insulating material interposed between the side walls of the inner receptacle and the side walls of the outer receptacle and terminally resting on its lower edge on the annulus, the suspension of the inner receptacle within the outer receptacle spacing the bottom of the latter from the bottom of the former and the space between the bottoms of the two receptacles being in direct communication with the space between the sides of said receptacles.

In testimony whereof I affix my signature in presence of two witnesses.

LEONARD R. STEEL.

Witnesses:
MABEL LAWRENCE,
JOHN D. LLOYD.